United States Patent [19]
Scott

[11] 3,783,709
[45] Jan. 8, 1974

[54] MACHINE GUARD

[76] Inventor: Robert E. Scott, 1471 Club Dr., Bloomfield Hills, Mich. 48013

[22] Filed: May 26, 1972

[21] Appl. No.: 257,084

[52] U.S. Cl. .................................. 74/612, 192/133
[51] Int. Cl. ............................................. F16p 3/08
[58] Field of Search ....................... 74/608, 612; 192/133

[56] References Cited
UNITED STATES PATENTS

| | | | |
|---|---|---|---|
| 2,913,926 | 11/1959 | Hammond | 74/612 |
| 2,307,524 | 1/1943 | Malcom | 74/612 |
| 2,491,035 | 12/1949 | Deacon | 192/133 X |
| 2,555,346 | 6/1951 | Larsen | 192/133 |
| 2,557,300 | 6/1951 | Lowry | 74/612 X |

*Primary Examiner*—Charles J. Myhre
*Assistant Examiner*—F. D. Shoemaker
*Attorney*—William H. Griffith

[57] ABSTRACT

A machine guard for protecting the machine operator and others comprising a cage-like hood adapted to at least partially cover the machine when in use and capable of being swung away from the machine to a retracted position. Means are provided to cut off power to the machine immediately upon initial retraction of the hood.

6 Claims, 4 Drawing Figures

PATENTED JAN 8 1974  3,783,709
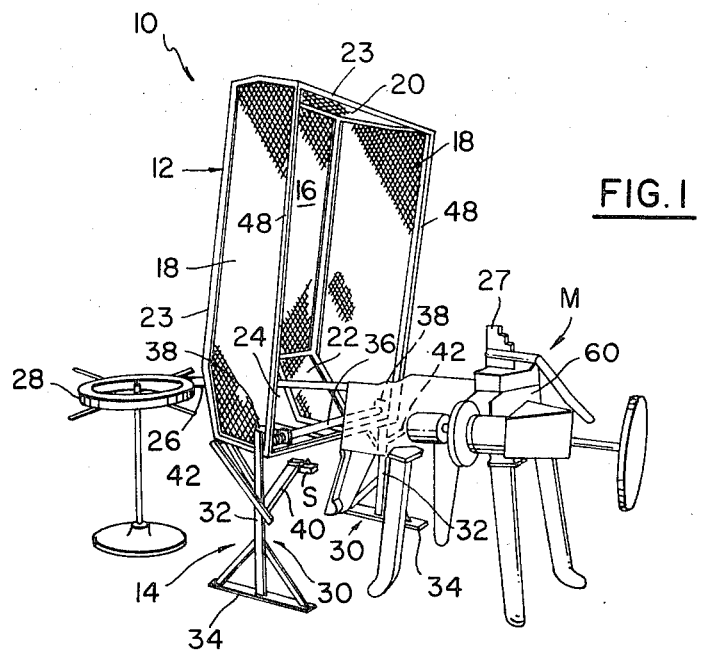
FIG. 1
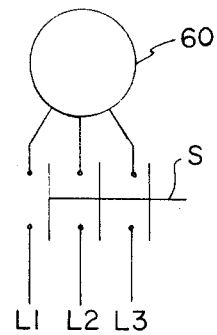
FIG. 4
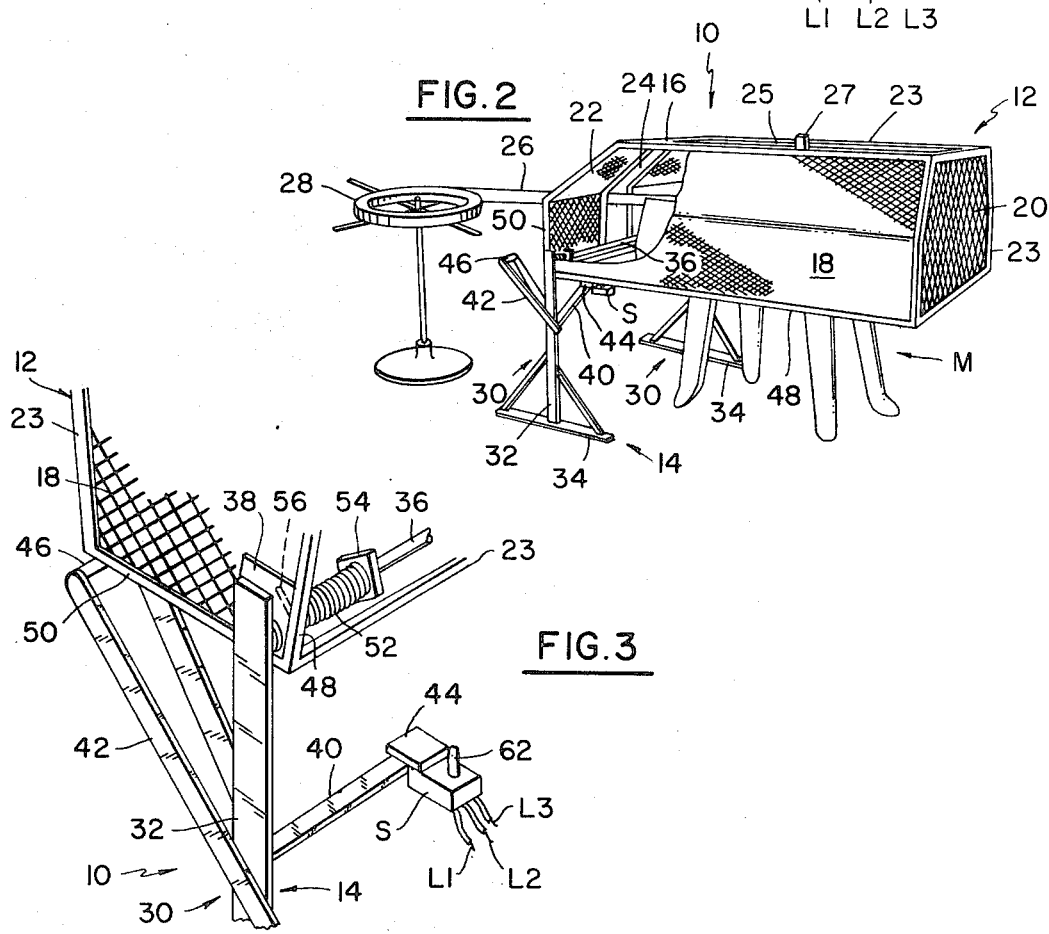
FIG. 2
FIG. 3

MACHINE GUARD

BACKGROUND AND SUMMARY OF THE INVENTION

Government safety standards now require special guards on certain machines and in particular those having reciprocating actions. Until recently, guards were not always used. Those employed were difficult to handle and usually took up too much space. It is a principal object of this invention to provide a machine guard which is of an improved construction and which meets government standards now in force.

Another object of the invention is to provide a machine guard which will take up a minimum of floor space and offer the least inconvenience to the operator and to setup personnel.

Another object is to provide a machine guard having means for preventing machine operation when the guard is removed or retracted.

Another object is to provide a machine guard which is portable and which will not interfere with the operation of the machine.

Other objects and features of the invention will become apparent as the description proceeds, especially when taken in conjunction with the accompanying drawing wherein:

FIG. 1 is a perspective view of machine guard apparatus set up adjacent to a machine and shown in retracted position.

FIG. 2 is a perspective view similar to FIG. 1 but showing the machine guard in its operative position of use.

FIG. 3 is an enlarged fragmentary perspective view of a portion of FIG. 1.

FIG. 4 is a diagrammatic view showing the machine motor and the safety switch associated therewith.

Referring now more particularly to the drawing, the machine guard apparatus 10 is shown in association with a machine M which may be of any particular type such as a fourslide machine, for example.

The apparatus 10 includes a guard 12 which is in the form of a cage or box-like hood and which is adapted to fit over and cover the machine when the machine is in use, as shown in FIG. 2. The apparatus also includes a portable support or stand 14 upon which the guard is mounted.

The guard or hood 12 has a top wall 16, side walls 18 and end walls 20 and 22. These walls may be of any suitable construction but are here shown as being of open grid construction which may be formed, for example, from expanded metal to enable the machine operator to view the operation of the machine through the guard 12. The walls of the guard are joined along their edges by the metal framing 23, and the bottom of the guard is open so that it may fit over and partially cover the sides of the machine.

An opening 24 is formed in the end wall 22 to provide clearance for the strip of material 26 being fed into the machine from the supply reel 28, and is large enough not to interfere with the strip matrial in any of the positions of the guard between and including its horizontal position of use shown in FIG. 2 and its raised or retracted position shown in FIG. 1. An opening 25 is also provided in the top wall 16 to clear a projecting part 27 of the machine when the guard is in the horizontal FIG. 1 position.

The stand 14 comprises a pair of identical, laterally spaced uprights 30 which may include the vertical legs 32 and the supporting bases 34. A horizontal pivot shaft 36 connects the upper ends of the legs 32.

The guard 12 has plates 38 on the side walls 18 formed with openings to pivotally receive the shaft 36, whereby the guard 12 is hinged for pivotal movement about the shaft 36 between the FIG. 1 and FIG. 2 positions.

The uprights 30 are provided with rest pads or stops 44 and 46. While the exact form of construction may vary, in this instance the stops 44 and 46 are carried by arms 40 and 42. Arms 40 are shown as being secured at their lower ends to the legs and inclined upwardly and forwardly having the stops 44 on their upper ends. Arms 42 are shown as being secured to legs 32 at their lower ends and inclined upwardly and rearwardly, having the stops 46 on their upper ends. The stops 44 of the two uprights 30 are disposed in a common horizontal plane, as are stops 46.

When the guard 12 is in its operative position, or position of use, shown in FIG. 2, it extends horizontally from the pivot shaft 36 with its bottom frame bars 48 respectively resting upon and supported by the stops 42. When the guard is raised to the generally upright position of FIG. 1 in which it is retracted from the machine, its frame bars 50 rest upon and are supported by the respective stops 46. As the guard is raised from the FIG. 2 to the FIG. 1 position, its center of gravity passes over the pivot shaft 36 so that it will be in a stable over-center condition when resting upon the stops 46. In the raised or retracted position of FIG. 1, the guard uncovers and fully exposes the machine M so that it can be attended to without interference.

A coil spring 52 encircles pivot shaft 36 and serves as a counterbalancing means for the guard. One end of the spring is secured to a block 54 rigidly mounted on the pivot shaft. The other end 56 of the spring is rigidly secured to a plate 38 on the guard. The coil spring is such that it winds up or is placed in increasing tension when the guard is lowered to the FIG. 2 position, and unwinds when it is raised to the FIG. 1 position. Thus the coil spring 52 serves as a counterbalance and makes it easier to manually lift the guard to the FIG. 1 position. It also remains under sufficient tension in the FIG. 1 position to supply a resilient force tending to hold the guard seated in the over-center position of FIG. 1 at rest upon the stops 46.

While stops 40 and 46 are preferably provided on both uprights 30, such stops 40 and 46 may if desired be provided on one only of the uprights 30.

The machine M has an electric motor 60 for driving the various slides and components of the machine. Lines L1, L2 and L3 supply electrical power to the motor. A switch S is provided for opening and closing the electrical circuit. Switch S is normally open as shown in FIG. 4.

Switch S is carried by one of the stops 44 as shown in FIG. 3, and its actuating button 62 extends above the level of the stop in a position to be engaged and depressed by the frame bar 48 of the guard when the guard is lowered to the operative position of FIG. 2 and the frame bar rests upon stop 44.

When thus depressed, the button 62 closes switch S to close the circuit to motor 60 so that it may operate the machine. However, upon initial raising of the guard 12 from the FIG. 2 position, button 62 is released and the switch S returns to its normally open position cutting off power to the motor 60 and rendering the motor 60 and the machine parts inoperative until the guard is once again returned to the FIG. 2 position.

The apparatus of my invention is portable, takes up a minimum of floor space, and fully protects the operator and others near the machine. The guard is easily lifted to an out-of-the-way position to allow access to the machine.

What I claim as my invention is:

1. Apparatus for guarding a machine comprising a support adapted to be positioned adjacent to a machine, a guard adapted to at least partially cover the machine when in operative position with respect thereto, means comprising a hinge connection mounting said guard on said support for swinging movement from said operative position to a retracted position, said guard when in said operative position extending generally horizontally and when in said retracted position being raised so as to extend generally upward from said hinge connection, stops for supporting said guard in said operative and retracted positions, said guard when in said retracted position resting on one of said stops in a stable, over-center position, and counterbalancing means urging said guard toward said raised retracted position.

2. The apparatus defined in claim 1, wherein said counterbalancing means comprises a coil spring associated with said hinge connection.

3. The apparatus defined in claim 2, wherein said guard has an opening of an extent sufficient to clear an elongated member fed into the machine in said operative and retracted positions and in all intermediate positions.

4. The apparatus defined in claim 3, including a switch for controlling electrical energy to the machine being guarded, said switch being normally open to interrupt the flow of electrical energy and being mounted on the stop which supports said guard in its operative position, and means on said guard for engaging and closing said switch when said guard is in its operative position.

5. Apparatus for guarding a machine comprising a support adapted to be positioned adjacent to a machine, a guard adapted to at least partially cover the machine when in operative position with respect thereto, pivot means mounting said guard on said support for pivotal movement from an operative position in which the center of gravity of said guard is at one side of the axis of said pivot means to a retracted position in which the center of gravity of said guard is at the opposite side of said axis of said pivot means such that said guard is in a stable, over-center condition, a stop for supporting said guard in said retracted position, and counterbalancing means urging said guard toward its retracted position.

6. The apparatus defined in claim 5, including switch means for controlling electrical energy to the machine being guarded, and means for closing said switch means in response to movement of said guard to said operative position and for opening said switch means when said guard is moved away from said operative position.

* * * * *